US012179498B2

(12) United States Patent
Humenick et al.

(10) Patent No.: US 12,179,498 B2
(45) Date of Patent: Dec. 31, 2024

(54) MULTI-STATION DYE SUBLIMATION APPARATUS FOR PRE-HEATING AND FOR FACILITATING SIMULTANEOUS SUBLIMATION CYCLES

(71) Applicant: Sekisui Kydex, LLC, Bloomsburg, PA (US)

(72) Inventors: Jeffrey Humenick, Bloomsburg, PA (US); Jym Kauffman, Bloomsburg, PA (US); Rebecca Gallup, Bloomsburg, PA (US)

(73) Assignee: SEKISUI KYDEX, LLC, Bloomsburg, PA (US)

( * ) Notice: Subject to any disclaimer, the term of this patent is extended or adjusted under 35 U.S.C. 154(b) by 210 days.

(21) Appl. No.: 17/874,698

(22) Filed: Jul. 27, 2022

(65) Prior Publication Data

US 2023/0040243 A1 Feb. 9, 2023

Related U.S. Application Data

(60) Provisional application No. 63/229,975, filed on Aug. 5, 2021.

(51) Int. Cl.
*B41M 5/382* (2006.01)
*B41J 2/325* (2006.01)
(Continued)

(52) U.S. Cl.
CPC ................. *B41J 2/325* (2013.01); *B41J 2/38* (2013.01); *B41J 11/0024* (2021.01); *B41J 29/377* (2013.01)

(58) Field of Classification Search
CPC ..... B41J 2/325; B41J 2/38; B41J 2/475; B41J 11/0024; B41J 29/377; B41M 5/0358; B41M 5/38221
See application file for complete search history.

(56) References Cited

U.S. PATENT DOCUMENTS 5,154,119 A 10/1992 Fuqua et al.
5,644,351 A 7/1997 Matsumoto et al.
(Continued)

FOREIGN PATENT DOCUMENTS

WO WO-2020/162958 A1 8/2020

OTHER PUBLICATIONS

Invitation to Pay Addtl. Fees on PCT Appl. Ser. No. PCT/US2022/038162, dated Sep. 28, 2022 (2 pages).
(Continued)

*Primary Examiner* — Anh T Vo
(74) *Attorney, Agent, or Firm* — Foley & Lardner LLP

(57) ABSTRACT

An illustrative dye sublimation apparatus (also referred to as a dye sublimation machine) may have at least four stations, each station implementing a discrete step of a sublimation cycle. Multiple beds are rotatably mounted such that the beds pass through the stations to perform the corresponding steps. Therefore, the sublimation apparatus may perform multiple sublimation cycles simultaneously with the beds containing printed sheets and substrates at different steps of the multiple sublimation cycles. As the beds are rotatably mounted, the sublimation apparatus may allow for a fixed loading and unloading station proximate to a fixed, dedicated personnel station.

20 Claims, 4 Drawing Sheets

200

(51) Int. Cl.

| | |
|---|---|
| ***B41J 2/38*** | (2006.01) |
| ***B41J 11/00*** | (2006.01) |
| ***B41J 29/377*** | (2006.01) |

(56) References Cited

U.S. PATENT DOCUMENTS

| | | | | |
|---|---|---|---|---|
| 2001/0046404 | A1* | 11/2001 | Wotton .................. | B65H 5/224 400/578 |
| 2007/0006747 | A1* | 1/2007 | Broughton .......... | B41F 15/0863 101/115 |
| 2007/0039682 | A1 | 2/2007 | Drake et al. | |
| 2011/0097495 | A1 | 4/2011 | Burrows | |
| 2011/0229664 | A1 | 9/2011 | Hoggard | |
| 2012/0196085 | A1 | 8/2012 | Langan et al. | |
| 2015/0029289 | A1 | 1/2015 | Rosner et al. | |
| 2016/0221354 | A1 | 8/2016 | Will et al. | |
| 2021/0008901 | A1 | 1/2021 | Terrero et al. | |

OTHER PUBLICATIONS

International Preliminary Report on Patentability for US App. Serial No. PCT/US2022/038162 dated Feb. 6, 2024 (7 pages).
International Search Report and Written Opinion on PCT Appl. Ser. No. PCT/US2022/038162 dated Nov. 30, 2022 (10 pages).

* cited by examiner

200

300

400

MULTI-STATION DYE SUBLIMATION APPARATUS FOR PRE-HEATING AND FOR FACILITATING SIMULTANEOUS SUBLIMATION CYCLES

CROSS-REFERENCE TO RELATED APPLICATIONS

This application claims the benefit of and priority to U.S. Provisional Application No. 63/229,975, filed Aug. 5, 2021, the entire disclosure of which is incorporated by reference herein.

TECHNICAL FIELD

This application is directed generally towards a dye sublimation apparatus (also referred to as a dye sublimation machine), and more specifically towards a multi-station rotating dye sublimation apparatus with a pre-heating station and configured to facilitate multiple simultaneous sublimation cycles.

BACKGROUND

Dye sublimation is a process of infusing images to a substrate. An image to be infused is printed on a paper (or any type of sheet) using sublimation dyes (contained in the sublimation inks) and the printed paper is pressed against a substrate under heat. The heat causes the dyes to sublimate from a solid state on the printed paper into a gaseous state and travel to the substrate, where the dyes are deposited as solids. This sublimation process therefore infuses the image in the printed paper into the substrate. As the infused image is embedded within the substrate, the image may not chip, fade, or delaminate like capped and printed images.

A dye sublimation cycle performed by a conventional dye sublimation apparatus has three linear steps: loading, heating, and unloading. As shown in FIG. 1, at a loading step 114, a worker 120 loads a printed sheet 108 and a substrate 110 onto a bed 112. At a next heating step 116, heater banks 102 (formed by a plurality of heating elements) generate radiating heat 104 that causes dyes in the printed sheet 108 to sublimate from a solid state to a gaseous state and travel to the substrate 110 in the gaseous state. The dyes then get deposited as solids into the substrate 110 thereby infusing an image formed by the dyes on the printed sheet 108 into the substrate 110. A membrane 106 generally covers and keeps the printed sheet 108 and the substrate 110 pressed against each other. After the heating step 116, the worker 120 unloads the substrate 110 containing the infused image at an unloading step 118.

However, the above described sublimation cycle performed by a conventional dye sublimation apparatus with the linear steps has several technical shortcomings. For example, the heating step 116 generally takes about twelve minutes, and after the heating is completed, the worker 120 has to wait for the dye sublimation apparatus to cool down before unloading the substrate 110 at the unloading step 118. The dye sublimation apparatus cannot be used for a next sublimation cycle until the substrate 110 from the current cycle is unloaded at the unloading step 118. In other words, the worker 120 after the loading step 114 has to wait for the dye sublimation apparatus to heat up, heat the printed sheet 108, and cool down until the substrate 110 with the infused image is ready be unloaded at the unloading step 118. This process has a significant amount of down time and is therefore significantly inefficient. Furthermore, the loading step 114 may have to be performed at one end of the dye sublimation apparatus and the unloading step 118 may have to be performed at the other end of the dye sublimation apparatus. Such setup does not allow for a dedicated personnel station and the worker 120 may have to repeatedly move between two ends of the dye sublimation apparatus. Needing this repeated movement further contributes to the inefficiency of conventional dye sublimation cycles.

SUMMARY

What is therefore desired are dye sublimation systems and methods that may operate a sublimation cycle in its multiple discrete steps such that multiple steps from multiple sublimation cycles can be performed simultaneously. What is further desired are dye sublimation systems and methods that facilitate a dedicated personnel station such that movement of a worker during the multiple sublimation cycles is minimized.

Embodiments described herein attempt to solve the aforementioned technical problems and may provide other benefits as well. An illustrative dye sublimation apparatus (also referred to as dye sublimation machine) may have at least four stations, each station implementing a discrete step of a sublimation cycle. Multiple beds are rotatably mounted such that the beds pass through the stations with corresponding apparatuses to perform the corresponding steps. Therefore, the sublimation apparatus may perform multiple sublimation cycles simultaneously with the beds containing printed sheets and substrates at different steps of the multiple sublimation cycles. As the beds are rotatably mounted, the sublimation apparatus may allow for a fixed loading and unloading station proximate to a fixed, dedicated personnel station.

In one embodiment, a multi-station dye sublimation machine for infusing an image from a printed sheet to a substrate comprises a rotatably mounted bed configured to hold the printed sheet and the substrate and pass through each of a loading and unloading position, a pre-heating position, a heating position, and a cooling position during a sublimation cycle, the loading and unloading position configured to receive the printed sheet and the substrate prior to infusing the image and to allow a removal of the substrate after infusing the image, the pre-heating position configured to pre-heat the printed sheet, the heating position configured to heat the pre-heated printed sheet to sublimate one or more dyes forming the image, such that the one or more dyes travel to the substrate in a gaseous state and deposit into the substrate in a solid state thereby infusing the image into the substrate, and the cooling position configured to cool the substrate after infusing the image.

In another embodiment, a dye sublimation method for infusing an image from a printed sheet to a substrate comprises receiving, by a loading and unloading station of a dye sublimation machine, the printed sheet and the substrate prior to infusing the image; pre-heating, by a pre-heating station of the dye sublimation machine, the printed sheet; heating, by a heating station of the dye sublimation machine, the pre-heated printed sheet to sublimate one or more dyes forming the image, such that the one or more dyes travel to the substrate in a gaseous state and deposit into the substrate in a solid state thereby infusing the image into the substrate; cooling, by a cooling station of the dye sublimation machine, the substrate after infusing the image; and passing, by a rotatably mounted bed of the dye sublimation machine, the printed sheet and the substrate through each of the loading and unloading apparatus, the pre-heating apparatus, the heating apparatus, and the cooling apparatus during a sublimation cycle.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
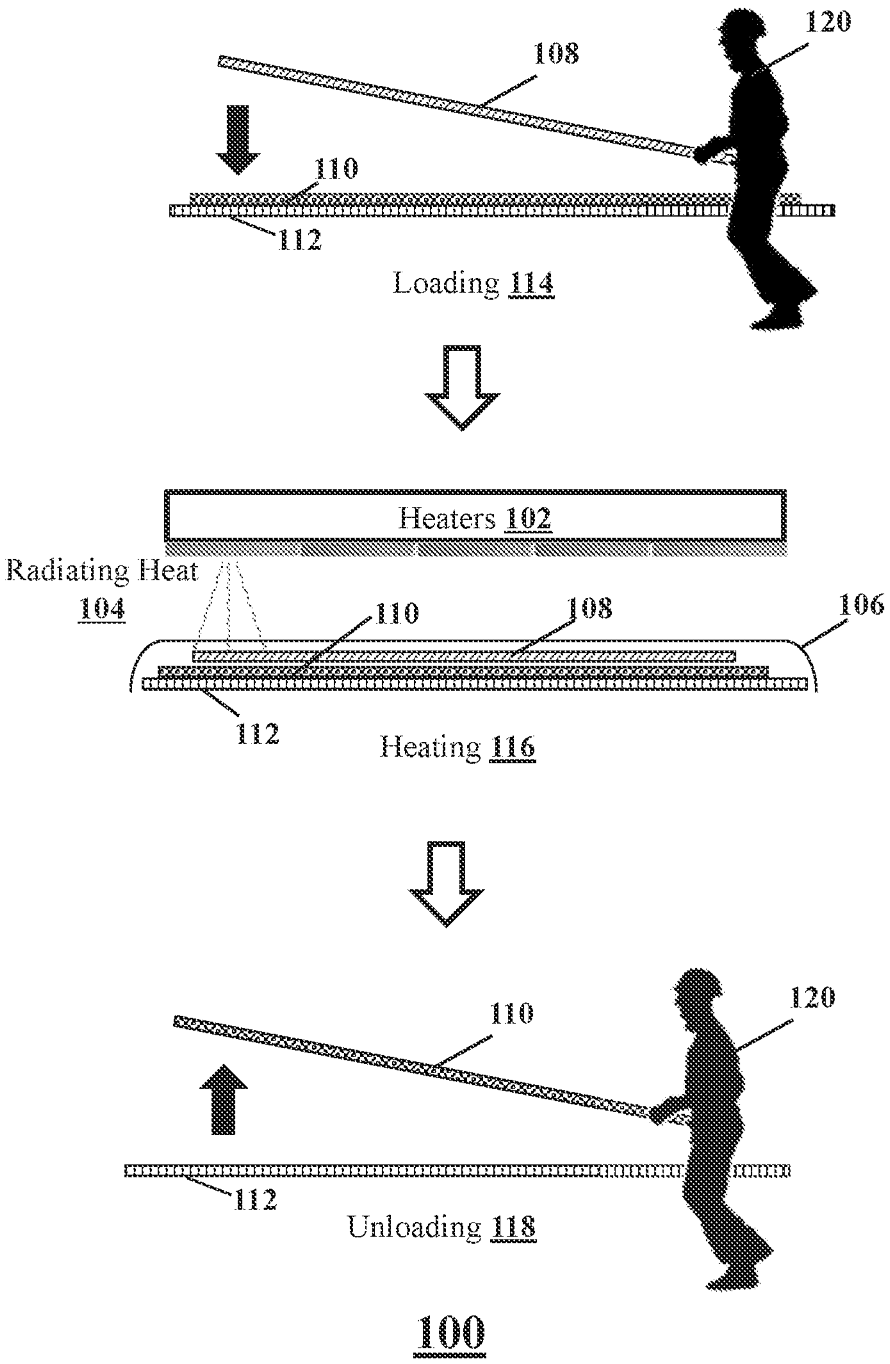
FIG. 1 PRIOR ART
FIG. 1 shows a conventional dye sublimation cycle.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods for dye sublimation utilizing a multi-station dye sublimation apparatus. An illustrative multi-station dye sublimation apparatus has multiple sublimation beds (also referred to as beds) and multiple stations for different steps of multiple sublimation cycles to perform the multiple sublimation cycles simultaneously. For example, the multi-station dye sublimation apparatus may have a loading and unloading station, a pre-heating station, a heating station, and a cooling station. The multiple beds may be rotatably mounted to rotate around a central axis to traverse the multiple stations to perform the different steps of the multiple sublimation cycles.

The loading and unloading station have an apparatus (e.g., rotatably mounted sublimation bed proximate to a personnel station) to allow a worker to load the dye sublimation apparatus with a printed sheet and a substrate at the beginning of a corresponding sublimation cycle. The loading and unloading station may further allow the worker to unload the substrate after the corresponding sublimation cycle is complete. As the sublimation beds are rotatably mounted, a given sublimation bed may start with a new printed sheet and a new substrate at the loading and unloading station; pass through the pre-heating station, the heating station, and the cooling station; and rotate back to the loading and unloading station with an infused image into the substrate. Therefore, a fixed personnel station may be placed proximate to the loading and unloading station and the worker does not have to move across the dye sublimation apparatus in between the loading and unloading steps.

The pre-heating station includes an apparatus to pre-heat a combination of a printed sheet and a substrate on a sublimation bed. For example, the pre-heating station has a heater that may pass a heated fluid (e.g., air, water, or oil) through the tubing (e.g., copper tubing) in the sublimation bed. The heated fluid may impart its heat to the printed sheet and the substrate to optimize dye sublimation at the heating station. A connector may connect with the sublimation bed to pass the heated fluid through the tubing in the sublimation bed. The heated fluid may pass through in several cycles before a desired temperature is reached at the pre-heating station.

The heating station includes apparatus to heat a combination of a pre-heated printed sheet and a substrate such that the dyes forming an image on the printed sheet sublimate and travel to the substrate to be deposited as solids. To generate the heat, the heating station includes multiple heating elements that may be grouped into several individually controllable heaters. The heating elements may be electric, e.g., heating coils, but any other type of electrical and/or chemical sources of heat should be considered within the scope of this disclosure.

The cooling station includes an apparatus to cool down a combination of a printed sheet and a substrate after the combination has passed through the heating station. For example, the cooling station includes a cooling apparatus that may use a cooled fluid (e.g., air, water, oil) to pass through the tubing in a sublimation bed containing the combination of the printed sheet and the substrate. A connector may interact with one or more orifices on the sublimation bed for the cooled fluid to pass between the sublimation made and the cooling apparatus. The cooling station may use several cycles of passing the cooled fluid to cool down the printed sheet and the substrate to a requisite temperature.

One or more processors (including microprocessors and/or controllers) may control the operation of the dye sublimation apparats and one or more of the stations. For example, a processor may control the rotation of the sublimation beds around the axis such that each bed is at a station for a predetermined amount of time. The processor may also control the heater of the heating station to pre-heat a combination of printed sheet and substrate thereon to a requisite temperature. The processor may further control the heating elements at the heating station such that a requisite temperature for an optimal dye sublimation is maintained. Additionally, the processor may also control the cooling apparatus of the cooling station such that a substrate containing an infused image is sufficiently cooled to be unloaded at the loading and unloading station. The processor may control these operations in the dye sublimation apparatus based upon user inputs (e.g., configuration parameters provided by the worker on an interface associated with the dye sublimation apparatus) and/or environmental variables such as ambient temperature.

Figure 2:
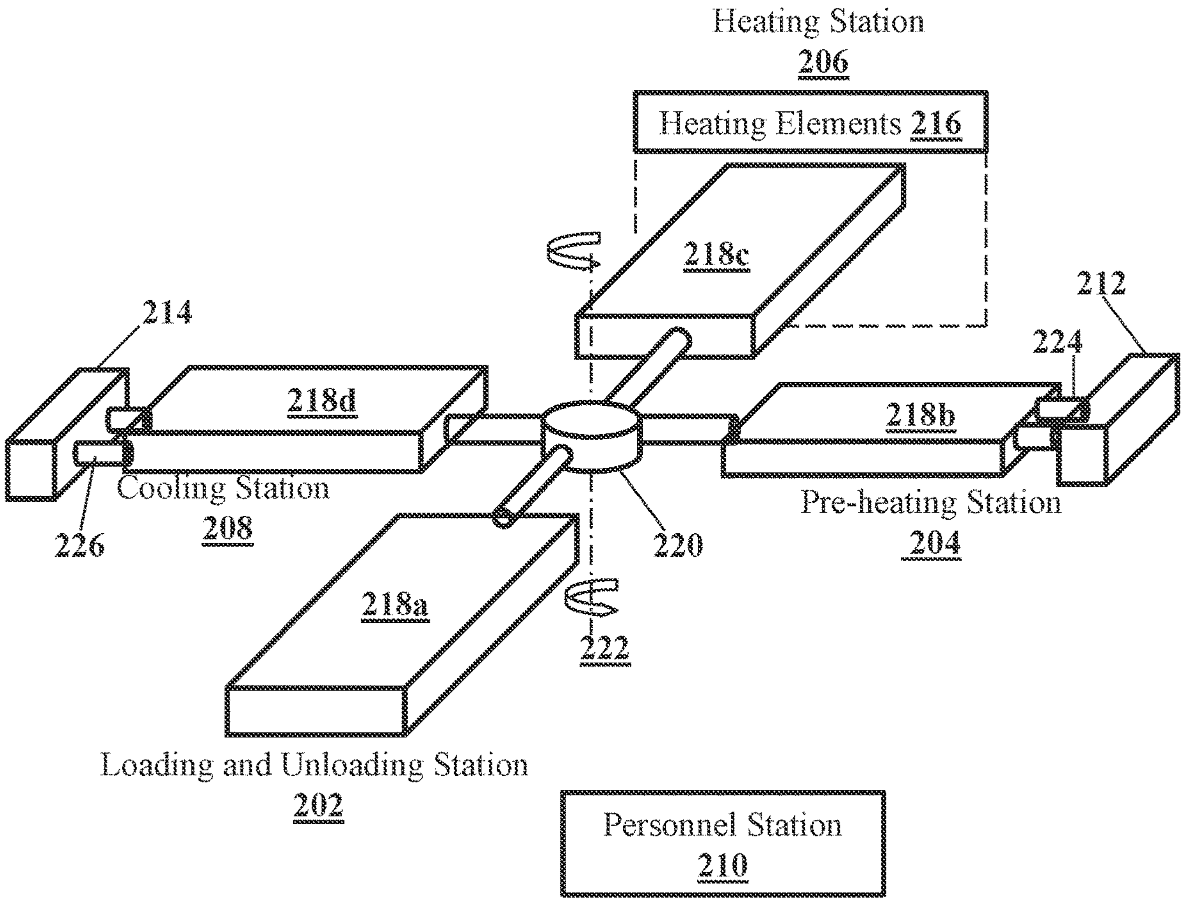
FIG. 2 shows an illustrative multi-station dye sublimation apparatus, according to an embodiment.

FIG. 2 shows an illustrative multi-station dye sublimation machine (also referred to as dye sublimation apparatus) 200, according to an embodiment. It should be understood that the dye sublimation machine 200 shown in FIG. 2 and described herein is merely for illustration and explanation and machines with other form factors and components should also be considered within the scope of this disclosure. For example, dye sublimation machines having additional, alternative, or a fewer number of components than the illustrative dye sublimation machine 200 should be included within the scope of this disclosure.

As shown, the dye sublimation machine 200 is a multi-station machine with illustrative four stations (or positions) to perform different steps of a sublimation cycle (also referred to as dye sublimation cycle). The illustrative four stations include a loading and unloading station 202, a pre-heating station 204, a heating station 206, and a cooling station 208. A plurality of sublimation beds 218*a*, 218*b*, 218*c*, 218*d* (collectively or commonly referred to as 218) pass through the stations 202, 204, 206, 208 such that each of the stations 202, 204, 206, 208 performs a corresponding step of a dye sublimation cycle. It should however be understood that the four stations 202, 204, 206, 208 and the four sublimation beds 218*a*, 218*b*, 218*c*, 218*d* are shown merely for explanation and should not be considered limiting. Furthermore, it should be understood that that the four steps of a sublimation cycle as described herein are merely for illustration and should not be considered limiting.

The sublimation beds 218 may hold printed sheets with images printed with sublimation dyes and corresponding substrates where the images are to be infused through the sublimation cycles. The sublimation beds 218 beds are to be broadly understood to include a surface where the printed sheet and the substrate are placed and any material that may provide a structural support to the surface. As an example, the surface may be a graphite with honeycomb structure and the structural support for the surface may be provided by a metallic material. In this example of the sublimation bed 218, the sublimation bed 218 should broadly include both the graphite surface and the material providing the structural support to the surface. Within each bed, a membrane or any other pressing or pressuring item may provide a downward pressure such that that the printed sheets and the substrates press against each other during the corresponding sublimation cycles. As shown, the sublimation beds 218 may be rotatably mounted to rotate around an axis 222. For example, the sublimation beds 218 may be attached to a central rotating wheel 220 utilizing corresponding shafts such that each of the sublimation beds 218 moves around the axis 222 when the central rotating wheel 220 is turned. The central rotating wheel 220 may be powered by an electric motor. A processor may control the rotating movement of the sublimation beds based upon user inputs or other environmental variables. In one alternative, the beds may be rotated about the wheel manually.

The loading and unloading station 202 may be proximate to a personnel station 210 to allow loading of printed sheets and substrates prior to the corresponding sublimation cycles and unloading of the printed sheets and the substrates after the corresponding sublimation cycles. For example, a worker may be at the personnel station 210 and may load a printed sheet and a substrate on a sublimation bed 218 at the loading and unloading station 202. The sublimation bed 218 may then move to (e.g., through a rotating motion) to the pre-heating station 204, then to the heating station 206, then to the cooling station 210, and then move back to the loading and unloading station 202. After this sublimation cycle (including the steps of pre-heating at the pre-heating station 204, heating at the heating station 206, cooling at the cooling station 208) is complete, the printed sheet and the substrate back at the loading and unloading station 202 are ready to be picked up. The worker may unload the printed sheet and the substrate and load a new substrate and printed sheet at the loading and unloading station 202 for a next sublimation cycle. It should however be understood that the worker may just remove the substrate after the corresponding sublimation cycle at the loading and unloading station 202. For example, the used printed sheet may automatically be removed through another process (e.g., forced air) and only the substrate with the infused image may come back at the loading and unloading station 202 after the corresponding sublimation cycle.

The pre-heating station 204 may pre-heat a printed sheet and a substrate on a sublimation bed 218*b* at the pre-heating station. The pre-heating station 204 may provide the heat to the printed sheet and the substrate through a heater. As a heating apparatus, for instance, the pre-heating section 204 may have a heater 212 with a fluid heater. The heater 212 may heat a fluid (e.g., air, water, oil) and pass the heated fluid through tubing (e.g., copper tubing) in the sublimation bed 218*b*. A connector 224 may facilitate the passage of the heated fluid from the heater 212 to the sublimation bed 218*b*. The connector 224 may include, for example, one or more protruding tubes to interact with orifices on the sublimation bed 218*b*. When the heated fluid passes into the sublimation bed 218*b*, the heated fluid may move through the tubing within the sublimation bed 218*b* dissipating its heat to the printed sheet and the substrate. After this movement, the fluid may pass back to the heater 212 through the connector 224. The pre-heating step may include multiple passes of heated fluid through the tubing within the sublimation bed 218*b* to provide the requisite amount of heat. A processor may control the heater 212 based upon inputs from the worker and/or other environmental variables (e.g., ambient temperature). The pre-heating station 204 may be covered to avoid dissipation of heat generated by the heater 212.

The heating station 206 may heat a printed sheet on the sublimation bed 218*c* to sublimate the dyes forming an image on the printed sheet. The sublimated dyes travel to a substrate and deposit thereon thereby infusing the image into the substrate. To heat the printed sheet, the heating station 206 may include, as a heating apparatus, heating elements 216. The heating elements 216 may be of any kind such as heating coils in any type configuration. The heating elements 216 may be electrically heated providing a radiative type heating to the combination of the printed sheet and the substrate. For example, the heating elements 216 may be included in multiple electrical heaters, each heating a section of the combination of the printed sheet and the substrate. The heating elements 216 may be within individual heaters that may be individually controlled by a processor. The heating elements 216 may also be divided into a plurality of zones, each zone containing one or more heaters. Therefore, the processor may individually control the heat output of each zone to maintain a consistent temperature at the sublimation bed 218*c* in the heating station 206. The heating station 206 may also be enclosed to mitigate against the heat radiating away from the heating station 206.

The cooling station 208 may cool a combination of a printed sheet and a substrate on the sublimation bed 218*d*. To that end, the cooling station 208 may include cooling apparatus 214 that may cool the printed sheet and the substrate utilizing cooled fluids (e.g., air, water, oil). The cooling apparatus 214 may connect to the sublimation bed 218*d* through a connector 226. For example, the connector 226 may include protruding tubes that may interact with orifices in the sublimation bed 218*d* such that the cooled fluid may pass through the tubing in the sublimation bed 218*d*. The cooled fluid may absorb from the printed sheet and the substrate the heat imparted by the heating elements

216 in the heating station 206. However, it should be understood that the cooling station 208 may not necessarily include the cooling apparatus 214 and the substrate may cool down to ambient temperature without the aid of the cooling apparatus 214. A processor attached to the cooling apparatus 214 may control the cooling apparatus 214 based upon a temperature measurement by a temperature sensor (not shown) in the cooling station 208.

In an illustrative operation, a worker at the personnel station 210 may place a first printed sheet and a first substrate on the sublimation bed 218*a* at the loading and unloading station 202. At this point, the sublimation bed 218*b* at pre-heating station 204 may already have a second printed sheet and a second substrate, the sublimation bed 218*c* at the heating station 206 may already have a third printed sheet and a third substrate, and the sublimation bed 218*d* at the cooling station 208 may already have a fourth printed sheet and a fourth substrate. Therefore, each of the sublimation beds 218*a*, 218*b*, 218*c*, 218*d* may be associated with a separate sublimation cycle. More particularly, the sublimation bed 218*a* may be at a loading step of a first sublimation cycle. The sublimation bed 218*b* may be at a pre-heating step of a second sublimation cycle. The sublimation bed 218*c* may be at a heating step of a third sublimation cycle. Finally, the sublimation bed 218*d* may be at a cooling step of a fourth sublimation cycle. The sublimation machine 200 may therefore be performing four sublimation cycles simultaneously. The worker at the fixed personnel station 210 may have to simply remove a cooled substrate with an infused image and place a new printed sheet and a new substrate at the loading and unloading station 202. Therefore, as opposed to a conventional dye sublimation apparatus where one has to wait for the dye sublimation apparatus to heat up and cool down thereby having a significant amount of down time, the dye sublimation machine 200 may be continuously used for multiple simultaneous sublimation cycles.

As described above one or more processors may control the operation of the dye sublimation machine 200, including the operation of the each of the stations 202, 204, 206, 208 and corresponding apparatuses thereon. For example, a processor may control the rotation of the central rotating wheel 220 thereby controlling the time a corresponding sublimation bed 218 remains at each station. The processor may control the heater 212 in the pre-heating section 204 to maintain a requisite pre-heating temperature in the pre-heating section 204. The processor may also control the heating elements 216 to maintain a requisite temperature for heating a printed sheet and a substrate on the sublimation bed 218*c*. The processor may further control the cooling apparatus 214 in the cooling station 208 to maintain a desired cooling rate for the heated printed sheet and the substrate. Therefore, the processor may be programmed to configure the operation of the dye sublimation machine 200.

Figure 3:
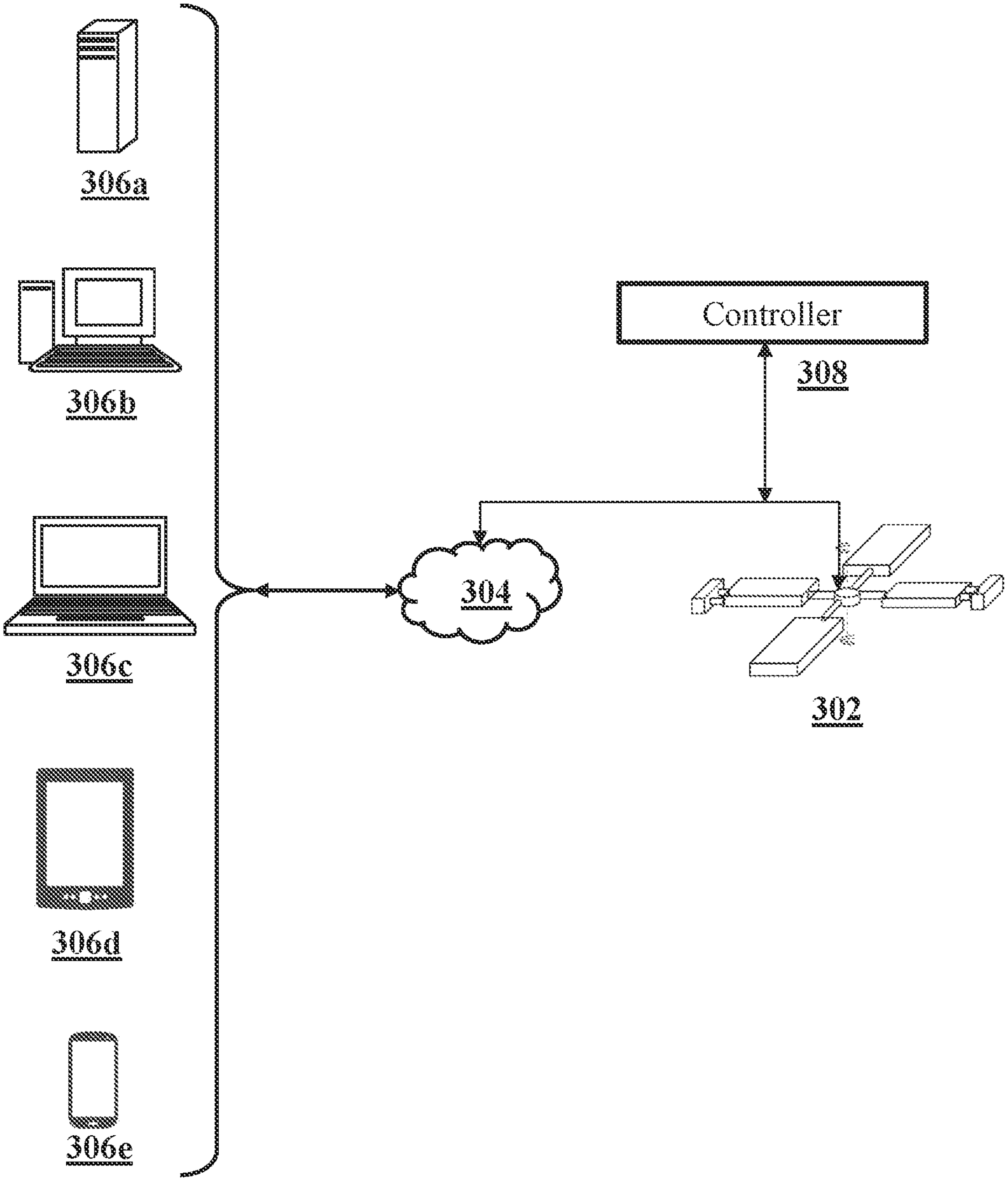
FIG. 3 shows an illustrative system with a multi-station dye sublimation apparatus, according to an embodiment.

FIG. 3 shows an illustrative system 300 for dye sublimation, according to an embodiment. As shown, the system 300 may comprise a dye sublimation apparatus (also referred to as a dye sublimation machine) 302, a network 304, computing devices 306*a*, 306*b*, 306*c*, 306*d*, 306*e* (collectively or commonly referred to as 306), and a controller 308. It should be understood that the system 300 and the aforementioned components are merely for illustration and systems with additional, alternative, and a fewer number of components should be considered within the scope of this disclosure.

The dye sublimation apparatus 302 may be a combination of components that may infuse (or dye sublimate) an image from multiple printed sheets to corresponding substrates. The images may be printed using sublimation inks containing sublimation dyes that may transform from solid state to gaseous state when heated to a predetermined temperature. The sublimation dyes may travel to the corresponding substrates and deposit thereon thereby generating infused images within the substrates. To support multiple sublimation cycles for multiple pairs of printed sheets and substrates, the dye sublimation apparatus 302 is divided into multiple stations. The dye sublimation apparatus 302 may have multiple rotatably mounted sublimation beds, each containing a corresponding pair of printed sheet and a substrate. At a given point in time, a sublimation bed may be at each station. For example, a first sublimation bed containing a first printed sheet and a first substrate may be at a loading and unloading station, a second sublimation bed containing a second printed sheet and a second substrate may be at a pre-heating station, a third sublimation bed containing a third printed sheet and a third substrate may be at a heating station, and a fourth sublimation bed containing a fourth printed sheet and a fourth substrate may be at a cooling station. Therefore, the dye sublimation apparatus 302 may support an assembly line of multiple sublimation cycles wherein each station is associated with a particular step (e.g., heating step) of the dye sublimation cycles.

A controller 308 may control various operations of the dye sublimation apparatus 302. The controller 308 may be any kind of programmable hardware controller to control, e.g., speed of rotation of the rotatably mounted dye sublimation beds and the temperatures of the pre-heating, heating, and cooling stations. The controller 308 may further control the time for each sublimation bed at a corresponding station, e.g., by allowing partial intermittent rotation of sublimation beds. In addition to the controller 308, dye sublimation apparatus 302 may be controlled based upon instructions provided by a computing device 306. For example, the computing device 306 may include an interface for a user to enter a desired amount of temperature at the heating station and the computing device 306 may provide instructions to the heating station through the network 304 to maintain such temperature. Alternatively or additionally, the computing device 306 may provide the instructions to maintain the temperature to the controller 308. In some embodiments, the computing device 306 may provide instructions to the dye sublimation apparatus 302 to maintain a first temperature at the pre-heating station, a second higher temperature at the heating station, and a third lower temperature at the cooling station. It should be understood that the instructions to maintain the corresponding temperatures may be implemented either in hardware, e.g., through the controller 308, or as a combination of hardware and software, e.g., through one or more applications in the computing device 306, the controller 308, and/or other hardware components in the dye sublimation apparatus. It should however be understood that these are just a few illustrations of control of the dye sublimation apparatus 302 by the computing devices 306 and/or the controller 308 and should not be considered limiting. Any type of control causing the dye sublimation apparatus 302 to configure and/or modify its operations should be considered within the scope of this disclosure.

The computing devices 306 may include any type processor-based device that may execute one or more instructions (e.g., instructions to maintain different temperatures at the pre-heating station, the heating station, and the cooling station) to the dye sublimation apparatus 302 through the network 304. Non-limiting examples of the computing devices 306 include a server 306*a*, a desktop computer 306*b*, a laptop computer 306*c*, a tablet computer 306*d*, and a smartphone 306*e*. However, it should be understood that the aforementioned devices are merely illustrative and other computing devices should also be considered within the scope of this disclosure. At minimum, each computing device 306 may include a processor and non-transitory storage medium that is electrically connected to the processor. The non-transitory storage medium may store a plurality of computer program instructions (e.g., operating system, applications) and the processor may execute the plurality of computer program instructions to implement the functionality of the computing device 306.

The network 304 may be any kind of local or remote network that may provide a communication medium between the computing devices 306 and the dye sublimation apparatus 302. For example, the network 304 may be a local area network (LAN), a desk area network (DAN), a metropolitan area network (MAN), or a wide area network (WAN). However, it should be understood that aforementioned types of networks are merely illustrative and any type of component providing the communication medium between the computing devices 306 and the dye sublimation apparatus 302 should be considered within the scope of this disclosure. For example, the network 304 may be a single wired connection between a computing device 306 and the dye sublimation apparatus 302.

Figure 4:
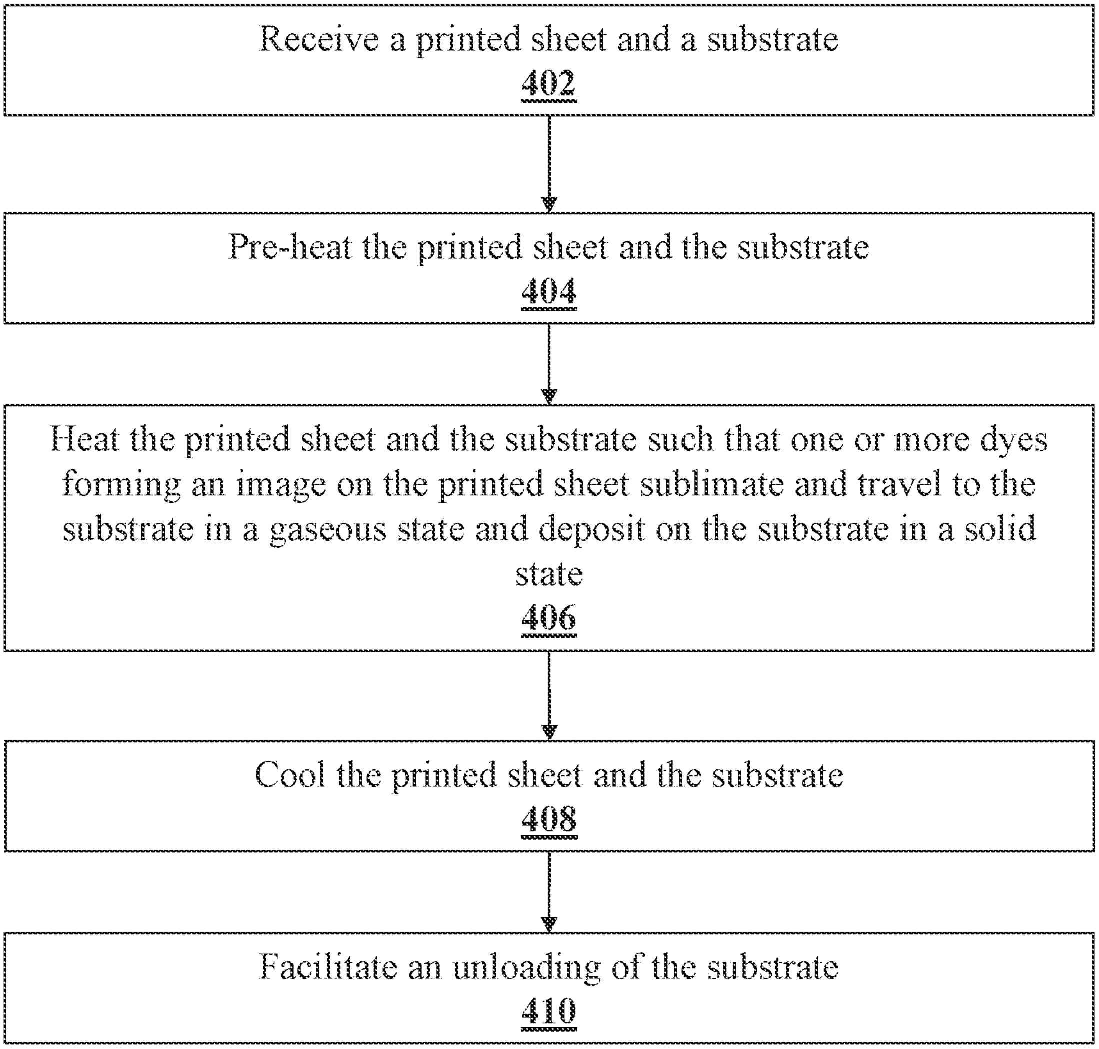
FIG. 4 shows a flow diagram of an illustrative method for dye sublimation utilizing a multi-station dye sublimation apparatus, according to an embodiment.

FIG. 4 shows a flow diagram of an illustrative method 400 for dye sublimation, according to an embodiment. The steps of the method 400 described herein are merely illustrative and methods with alternative, additional, and fewer number of steps should also be considered within the scope of this disclosure. It should further be understood that the four stations of a multi-station dye sublimation apparatus are merely illustrative and additional, alternate, or fewer number of stations should be considered within the scope of this disclosure.

The method may begin at a loading step 402, where a loading and unloading station of the multi-station dye sublimation apparatus may receive a printed sheet and a substrate. The printed sheet may include an image formed by one or more sublimation dyes. The image may have to be infused into the substrate after the completion of the sublimation cycle. A rotatably mounted sublimation bed may pass the printed sheet and the substrate through the multiple stations in the multi-station dye sublimation machine. A worker at a fixed personnel station proximate to the loading and unloading station may place the printed sheet and the substrate on a sublimation bed at the loading and unloading station. The sublimation bed may then move to the pre-heating station for a next pre-heating step 404.

At the next pre-heating step 404, the pre-heating station of the multi-station dye sublimation apparatus may pre-heat the printed sheet and the substrate. The pre-heating station may include a heater that may cause heated fluid to pass through tubing (e.g., copper tubing) of the sublimation bed to impart heat to the printed sheet and the substrate. A processor may control the pre-heating station to cause the heated fluid through the tubing for one or more cycles until reaching a requisite temperature.

At a next heating step 406, a heating station of the multi-station dye sublimation apparatus may heat the printed sheet and the substrate such that the one or more dyes forming the image on the printed sheet sublimate and travel to the substrate in a gaseous state. The sublimated dyes deposit into the substrate as solid thereby infusing the image into the substrate. A processor may control a plurality of heating elements in the heating station such that the heating station maintains a requisite temperature for infusing the image through dye sublimation.

At a next cooling step 408, a cooling station of the multi-station dye sublimation apparatus may cool the printed sheet and the substrate. In an embodiment, the cooling station may include a fluid based cooling apparatus, which may inject cooled fluid into the tubing (e.g., copper tubing) of the sublimation bed. A processor may control the cooling apparatus such that the cooling station cools down the printed sheet and the substrate to a desired temperature.

At a next unloading step 410, the loading and unloading station of the multi-station dye sublimation apparatus may facilitate a worker to unload a substrate. When a sublimation bed arrives back at the loading and unloading station, the printed sheet and substrate may have undergone the steps of pre-heating, heating, and cooling and are ready to be removed. The worker may unload the arriving printed sheet and substrate and load a new printed sheet and a new substrate for a next sublimation cycle.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A multi-station dye sublimation machine for infusing an image from a printed sheet to a substrate, the dye sublimation machine comprising:

a rotatably mounted bed configured to hold the printed sheet and the substrate and pass through each of a loading and unloading position, a pre-heating position, a heating position, and a cooling position during a sublimation cycle, wherein the loading and unloading position is configured to receive the printed sheet and the substrate prior to infusing the image and allow a removal of the substrate after infusing the image, wherein the pre-heating position is configured to pre-heat the printed sheet, wherein the heating position is configured to heat the pre-heated printed sheet to sublimate one or more dyes forming the image, such that the one or more dyes travel to the substrate in a gaseous state and deposit into the substrate in a solid state thereby infusing the image into the substrate, and wherein the cooling position is configured to cool the substrate after infusing the image.

2. The dye sublimation machine of claim 1, wherein the bed includes a plurality of tubes.

3. The dye sublimation machine of claim 2, wherein the pre-heating position is configured to pass heated fluid through the plurality of tubes.

4. The dye sublimation machine of claim 3, wherein the heated fluid is at least one of air, water, or oil.

5. The dye sublimation machine of claim 2, wherein the cooling position is configured to pass cooled fluid through the plurality of tubes.

6. The dye sublimation machine of claim 5, wherein the cooled fluid is at least one of air, water, or oil.

7. The dye sublimation machine of claim 2, wherein the plurality of tubes comprise copper.

8. The dye sublimation machine of claim 1, wherein the bed comprises a graphite with a honeycomb structure.

9. The dye sublimation machine of claim 1, further comprising:

a second rotatably mounted bed configured to hold a second printed sheet and a second substrate, a third rotatably mounted bed configured to hold a third printed sheet and a third substrate, and a fourth rotatably mounted bed configured to hold a fourth printed sheet and a fourth substrate such that the dye sublimation apparatus simultaneously operates four sublimation cycles for the printed sheet and the substrate, the second printed sheet and the second substrate, the third printed sheet and the third substrate, and the fourth printed sheet and the fourth substrate.

10. The dye sublimation machine of claim 9, wherein the rotatably mounted bed, the second rotatably mounted bed, the third rotatably mounted bed, and the fourth rotatably mounted bed are configured to rotate around a common axis such that each bed repeatedly passes through a fixed personnel location.

11. A dye sublimation method for infusing an image from a printed sheet to a substrate, the method comprising:

receiving, by a loading and unloading station of a dye sublimation machine, the printed sheet and the substrate prior to infusing the image;

pre-heating, by a pre-heating station of the dye sublimation machine, the printed sheet;

heating, by a heating station of the dye sublimation machine, the pre-heated printed sheet to sublimate one or more dyes forming the image, such that the one or more dyes travel to the substrate in a gaseous state and deposit into the substrate in a solid state thereby infusing the image into the substrate;

cooling, by a cooling station of the dye sublimation machine, the substrate after infusing the image; and passing, by a rotatably mounted bed of the dye sublimation machine, the printed sheet and the substrate through each of the loading and unloading apparatus, the pre-heating apparatus, the heating apparatus, and the cooling apparatus during a sublimation cycle.

12. The dye sublimation method of claim 11, wherein the bed includes a plurality of tubes.

13. The dye sublimation method of claim 12, further comprising:

passing, by the pre-heating station, heated fluid through the plurality of tubes.

14. The dye sublimation method of claim 13, wherein the heated fluid is at least one of air, water, or oil.

15. The dye sublimation method of claim 12, further comprising:

passing, by the cooling station, cooled fluid through the plurality of tubes.

16. The dye sublimation method of claim 15, wherein the cooled fluid is at least one of air, water, or oil.

17. The dye sublimation method of claim 12, wherein the plurality of tubes comprise copper.

18. The dye sublimation method of claim 11, wherein the bed comprises a graphite with a honeycomb structure.

19. The dye sublimation method of claim 11, further comprising:

simultaneously operating, by the dye sublimation machine, four sublimation cycles for the printed sheet and the substrate, a second printed sheet and a second substrate on a second rotatably mounted bed, a third printed sheet and a third substrate on a third rotatably mounted bed, and a fourth printed sheet and a fourth substrate on a fourth rotatably mounted bed.

20. The dye sublimation method of claim 19, wherein the rotatably mounted bed, the second rotatably mounted bed, the third rotatably mounted bed, and the fourth rotatably mounted bed rotate around a common axis such that each bed repeatedly passes through a fixed personnel location.

* * * * *